(12) United States Patent
Yoon

(10) Patent No.: US 9,251,714 B2
(45) Date of Patent: Feb. 2, 2016

(54) METHOD AND DEVICE FOR LEARNING IN ELECTRONIC BOOK READER

(75) Inventor: Jun Yoon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 9 days.

(21) Appl. No.: 13/297,583

(22) Filed: Nov. 16, 2011

(65) Prior Publication Data

US 2012/0129142 A1    May 24, 2012

(30) Foreign Application Priority Data

Nov. 18, 2010   (KR) ........................ 10-2010-0114885

(51) Int. Cl.
  *G09B 5/06*    (2006.01)
  *G09B 7/02*    (2006.01)
  *G09B 19/06*   (2006.01)
(52) U.S. Cl.
  CPC .. *G09B 5/06* (2013.01); *G09B 7/02* (2013.01); *G09B 19/06* (2013.01)

(58) Field of Classification Search
  CPC .............. G09B 7/00; G09B 7/02; G09B 7/06; G09B 7/07; G09B 7/066; G09B 5/00; G09B 5/06; G09B 19/06
  USPC .................. 434/156–185, 322–365, 414, 419
  See application file for complete search history.

(56) References Cited

U.S. PATENT DOCUMENTS

| 5,281,146 | A * | 1/1994 | Janney | 434/348 |
| 7,865,129 | B2 * | 1/2011 | Maslen et al. | 434/317 |
| 2004/0002043 | A1 * | 1/2004 | Dowrick | 434/178 |
| 2005/0191608 | A1 * | 9/2005 | Ternouth | 434/322 |

* cited by examiner

*Primary Examiner* — Timothy A Musselman
(74) *Attorney, Agent, or Firm* — Cha & Reiter, LLC.

(57) ABSTRACT

Provided is a method and device for learning in an electronic book reader. A method for learning in an electronic book reader includes displaying a mask region covering an object of electronic book contents displayed on a screen, and releasing the displayed mask region to again display the covered object of the electronic book contents.

14 Claims, 11 Drawing Sheets

FIG.6

METHOD AND DEVICE FOR LEARNING IN ELECTRONIC BOOK READER

CLAIM OF PRIORITY

This application claims the benefit of priority under 35 U.S.C. §119 from Korean patent application serial no. 10-2010-0114885 filed in the Korean Intellectual Property Office on Nov. 18, 2010, the contents of which are incorporated by reference herein in its entirety.

BACKGROUND OF THE INVENTION

1. Field of the Invention

The present invention relates generally to an electronic book reader. More particularly, the present invention relates to an electronic book reader having a learning function.

2. Description of the Related Art

Electronic books (also referred to as "e-books") is a generic term for books in electronic digital form (rather than on paper) that are designed to store the contents of writings, which have been published or may be published, in a digital data format on electronic recording media or storage devices. A user of an electronic book can read, see and hear the stored contents through wired/wireless information communication networks by computers or portable terminals. Such electronic books are provided in the shapes of various contents according to various purposes.

An electronic book is less expensive than printing a paper book, and kinder to the environment. Also, the electronic book may save time by on-line purchasing and only a desired portion of the electronic book may be purchased separately. A recent version of an electronic book enables a user to enjoy a video or background music while reading the written portion, and it may be stored in a personal digital assistant (PDA), or even a portable terminal, so that a desired book can be easily searched and read anywhere, anytime. Recent advances in the e-book industry have enabled improved screen resolution, various improvements in editing functions, paging by clicking, a memo function, text scaling up/down, and searching/downloading of documents or contents from Internet bookstores or libraries.

However, recent advances in e-book technologies are still insufficient to satisfy users' desires. For example, although electronic books are starting to become widely used instead of paper books to provide learning functions, they still lack in providing learning tools and are currently operated essentially like paper books.

SUMMARY OF THE INVENTION

The present invention was made in part to solve at least some of the above problems and/or disadvantages and to provide at least the advantages described herein below. Accordingly, an object of the present invention is to provide an electronic book reader having a learning function.

An exemplary aspect of the present invention provides a method and device for increasing a learning effect in an electronic book reader.

In accordance with an exemplary aspect of the present invention, a method for learning in an electronic book reader is provided. The method preferably includes displaying a mask region covering an object of electronic book contents displayed on a screen, and releasing the displayed mask region to again display the covered object of the electronic book contents.

In accordance with an exemplary aspect of the present invention, a device for learning in an electronic book in an electronic book reader is provided. The apparatus preferably includes a non-transitory memory unit that stores target data; a display unit that decodes the data stored in the memory unit to display output of an image signal; an input unit that receives a user input; and a control unit that controls an overall operation of the electronic book reader, wherein the control unit displays a mask region on the display unit when a mask region creation signal is generated from the input unit, and releases the displayed mask region when a mask region release signal is generated from the input unit.

Other exemplary aspects, advantages and salient features of the present invention will become more apparent to those skilled in the art from the following detailed description, which, taken in conjunction with the annexed drawings, discloses exemplary embodiments of the invention in more detail.

BRIEF DESCRIPTION OF THE DRAWINGS

The above and other exemplary aspects, features and advantages of the present invention will become more apparent from the following detailed description when taken in conjunction with the accompanying drawings in which:

FIG. 6 is a diagram illustrating a process of learning with an electronic book reader according to an exemplary embodiment of the present invention;

Throughout the drawings, like reference numerals will be understood to refer to like parts, components and structures.

DETAILED DESCRIPTION

The following description, with reference to the accompanying drawings, is provided to assist a person of ordinary skill in the art with a comprehensive understanding of exemplary embodiments of the invention. The description includes various specific details to assist in that understanding but these details are to be regarded as merely exemplary. The drawings are provided for illustrative purposes and in no way should be used as a template to limit the presently claimed invention. Accordingly, those of ordinary skill in the art will recognize that various changes and modifications of the exemplary embodiments described herein can be made without departing from the scope and spirit of the invention. Also, descriptions of well-known functions and constructions may be omitted for clarity and conciseness so as not to obscure appreciation of the present invention by a person of ordinary skill with such well-known functions and constructions.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims.

It is to be understood that the singular forms "a", "an", and "the" include plural references unless the context clearly dictates otherwise. Thus, for example, reference to "a component surface" typically includes reference to one or more of such surfaces.

By the term "substantially" typically means that the recited characteristic, parameter, or value need not be achieved exactly, but that deviations or variations, including for example, tolerances, measurement error, measurement accuracy limitations and other factors known to those skilled in the art, and may occur in amounts that do not preclude the effect the characteristic was intended to provide.

Preferred exemplary embodiments of the present invention will now be described below with reference to the accompanying drawings.

The present invention relates to an electronic book (e-book) reader, and in particular, to an electronic book reader for providing an effective learning method and device.

Figure 1:
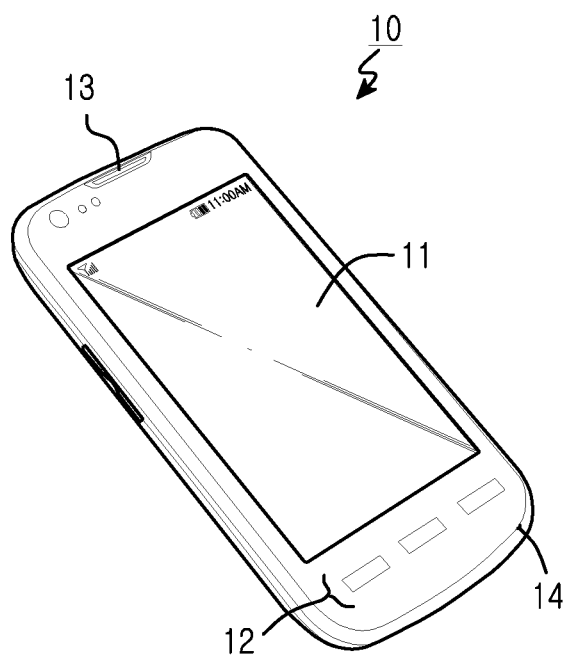
FIG. 1 is a perspective view of an electronic book reader according to an exemplary embodiment of the present invention.

FIG. 1 is a perspective view of an electronic book reader according to an exemplary embodiment of the present invention.

An electronic book reader 10 according to an exemplary embodiment of the present invention comprises a portable terminal having an electronic book function, examples of which include personal digital assistants (PDAs) and mobile phones, as two non-limiting examples. The invention is also compatible for use on tablet computers and other electronic devices.

Referring now to FIG. 1, the electronic book reader 10 includes a display unit for outputting video signals and a keypad 12 for inputting data. The mobile phone may further include a speaker 13 for outputting audio signals and a microphone 14 for inputting audio signals. The display unit 11 may comprise a liquid crystal display (LCD) having millions of pixels. However, other possible screen types using thin film technology can be used with the invention including but in no way limited to LED, OLED and AMOLED. If the display unit 11 is provided with a touchscreen, the display unit 11 may function as a data input unit in a supplementary manner or in lieu of the keypad 12. Hereinafter, for the purposes of this example it is assumed that the electronic book reader 10 drives an electronic book based on a touchscreen.

According to an exemplary embodiment, the electronic book reader 10 provides a learning function. The electronic book reader 10 may display a mask region on a screen thereof. The mask region comprises an opaque block or blocks for covering one or more objects of e-book contents displayed on the screen. These masks may be modified, released and/or moved. Examples of the objects of the e-book contents include characters and images. For example, in a learning process, the mask region is displayed to cover an answer to a question, and the user finds the answer to the question. When the mask region is released, the user may detect the answer to the question.

The mask region may be released in various ways. First, the mask region may be released by a single touch (a single tap). Secondly, the mask region may be activated as a writing window when being double-touched (double-tapped), and the mask region may be released when a text written by the user corresponds with the answer to the question. Thirdly, a voice recognition mode may be activated when the mask region is double-touched, and the mask region may be released when the user's reply corresponds with the answer to the question. The mask could also be released after an incorrect answer, or a predetermined number of attempts to answer the question correctly.

The mask region may be decorated in various ways. For example, the mask region may be decorated with an image.

Figure 2:
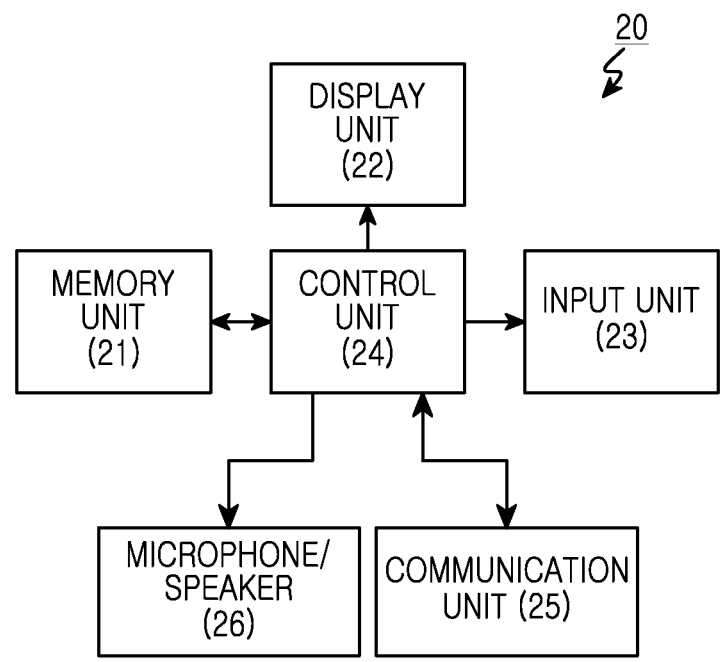
FIG. 2 is an exemplary block diagram of an electronic book reader according to an exemplary embodiment of the present invention.

FIG. 2 is a block diagram of an electronic book reader according to an exemplary embodiment of the present invention.

Referring now to FIG. 2, an electronic book reader 20 according to an exemplary embodiment of the present invention preferably includes a memory unit 21 for storing target data displayed, a display unit 22 for decoding the stored data to output an image signal, an input unit 23 for receiving a user input, and a control unit 24 for controlling an overall operation of the electronic book reader 20. The control unit 24 may recognize characters or voices, or a combination thereof, which will be described below.

When a mask region creation signal is generated from the input unit 23, the control unit 24 controls the display unit 22 to display a mask region. The mask region may vary according to the mask region creation signal. The mask region may be rectangular or elliptical. For example, when a touch moves in a touch region in an underlining manner, a mask region of a rectangular block is displayed to cover relevant words. The mask region may be a rectangular block having a diagonal line from a touch start point and a touch end point. Also, the mask region may be a closed region formed by a touch move path. That is, the mask region may vary in size and shape.

The control unit, which typically comprises a processor or microprocessor, controls overall operation of electronic book. A communication unit, which may be wireless and use an antenna to receive new subjects to be learned via the e-book, and possibly updates to the current items. Any wireless protocol including but not limited to CDMA, GSM, TDMA, FDMA or any similar protocol can be used, as well as Bluetooth, 802.11, WiMAX, WIBRO, WAP. Updates can also be downloaded via a USB port, etc.

When a scroll signal is generated from the input unit 23, the control unit 24 can control movement of the mask region, displayed on the display unit 22, in the corresponding direction. For example, when a scroll signal is generated to release the touch after the touch move, the control unit 24 controls the display unit 22 to move the displayed mask region to the touch end point. The mask region may be moved by moving a scroll bar provided in the touch region of the display unit 22. It is also within the spirit and scope of the invention that in an embodiment a stylus or pointing device can be used.

The control unit 24 releases display of the mask region when a mask region release signal is generated from the input unit 23. For example, the mask region may be released when the mask region is touched.

The control unit 24 preferably recognized characters. The control unit 24 may release the mask region when the inputted word is identical to the covered word. For example, when a word is covered with a mask region and a mask region release signal is generated from the input unit 23 by a double touch (a double tap) to the mask region, the control unit 24 activates a writing window in the mask region. The user may input a word as an answer in the writing window.

In addition, the control unit 24 may recognize a voice and convert the voice into characters. The control unit 24 may release the mask region when the inputted voice corresponds to the covered word. For example, when a word is covered with a mask region and a mask region release signal is generated from the input unit 23 by a double touch to the mask region, the control unit 24 receives and recognizes a voice together with a message for requesting a voice input to the mask region. Microphone/speaker unit 26 can receive the voice input, which can then be converted by a transducer and converted into an audio signal that is analyzed by voice recognition in the control unit.

Figure 3:
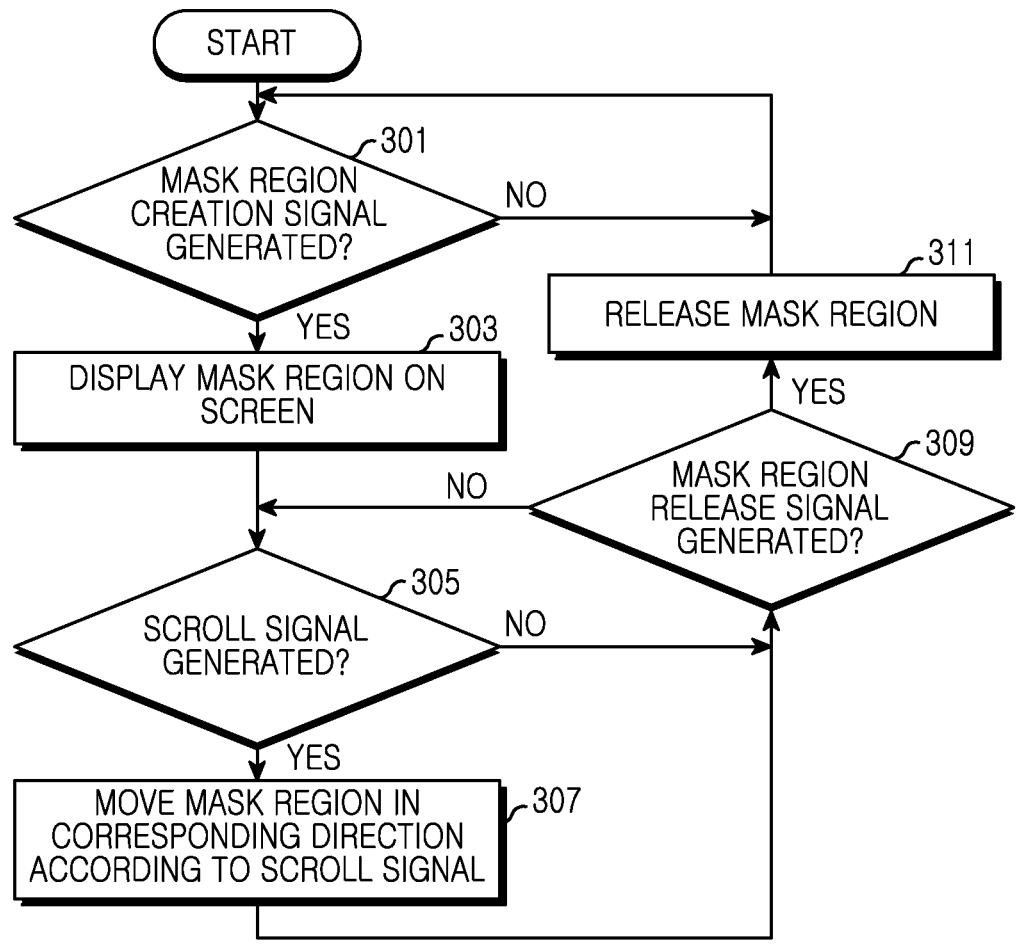
FIG. 3 is a flow diagram illustrating exemplary operation of a process of displaying, moving and releasing a mask region for learning in an electronic book reader according to an exemplary embodiment of the present invention.

FIG. 3 is a flow diagram illustrating a process of displaying, moving and releasing a mask region for learning in an electronic book reader according to an exemplary embodiment of the present invention.

Referring now to FIG. 3, in step 301, the control unit 24 determines whether or not a mask region creation signal is generated.

If the mask region creation signal is generated, the method proceeds to perform step 303. At step 303, the control unit 24 displays a mask region corresponding to the mask region creation signal.

At step 305, the control unit 24 determines whether or a scroll signal has been generated. If the scroll signal is generated, the control unit 24 proceeds to perform the action at step 307. At step 307, the control unit 24 moves display of the mask region in the corresponding direction according to the scroll signal.

At step 309, the control unit 24 determines whether or not a mask region release signal is generated. If the mask region release signal is generated, the control unit 24 proceeds to perform step 311. In step 311, the control unit 24 releases the mask region. The mask region release signal may be generated before or after the movement of the mask region. An example of FIG. 3 will now be described below with reference to FIGS. 4A to 8.

Figure 4A:
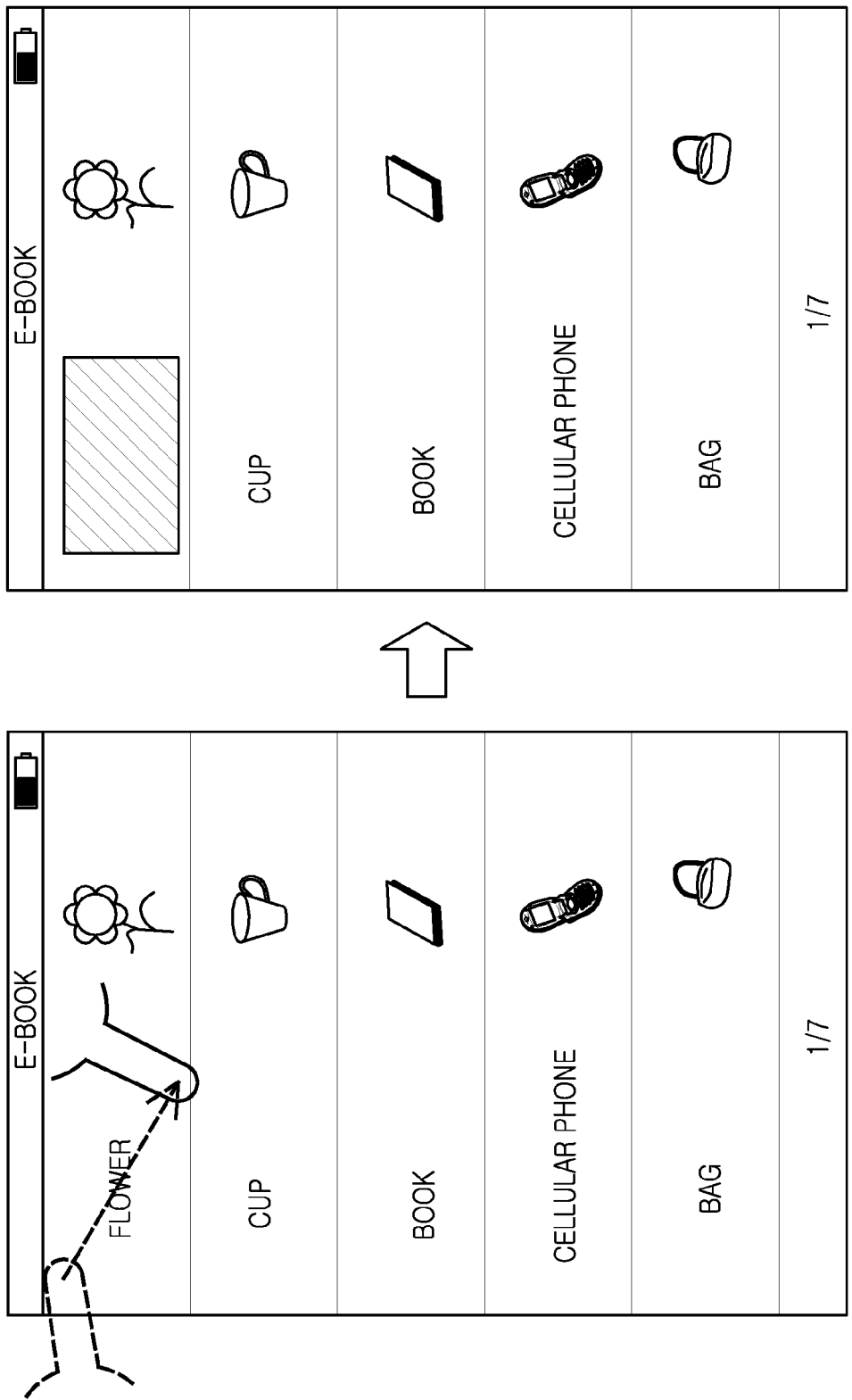
FIGS. 4A to 4C are diagrams illustrating a process of learning with an electronic book reader according to an exemplary embodiment of the present invention.
Figure 4B:
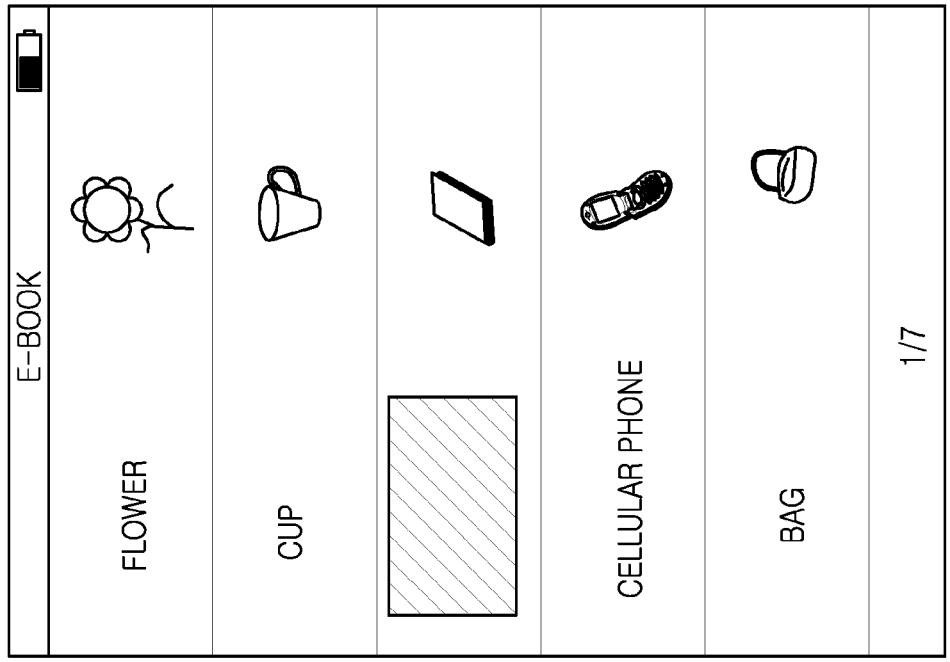
Figure 4B:
Figure 4B:
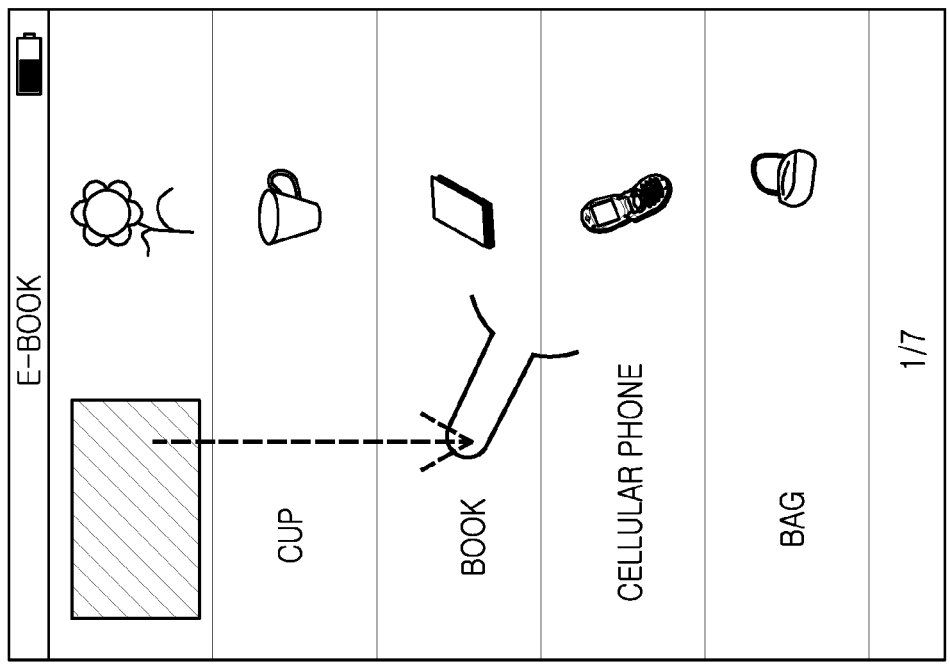
Figure 4C:
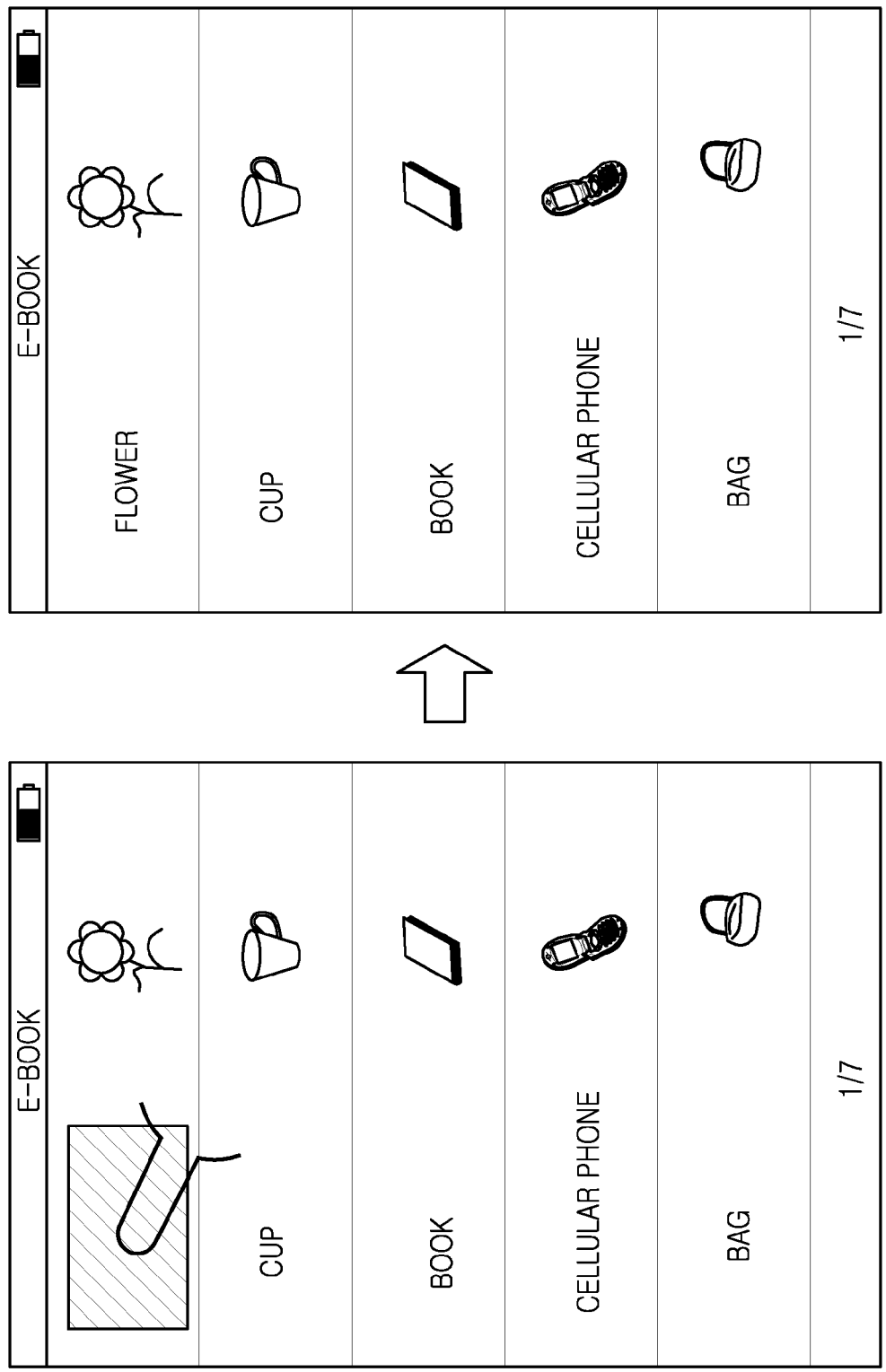

FIGS. 4A to 4C are diagrams illustrating a process of learning in an electronic book reader according to an exemplary embodiment of the present invention. The exemplary embodiment of FIGS. 4A to 4C illustrates a process of learning English words corresponding to objects. The right side of a screen of the electronic book reader displays object images, and the left side of the screen displays English words corresponding to the object images displayed on the right side of the screen.

Referring now to FIG. 4A, in order to display a mask region covering a left English word, the user moves a touch diagonally to generate a mask region creation signal. When the mask region creation signal is generated, a mask region is displayed in the shape of a rectangle (or substantially rectangular) having a diagonal line from a touch start point to a touch end point, as illustrated in FIG. 4A. The displayed mask region covers a word 'FLOWER'. However, an artisan should appreciate that any predetermined or user-defined shape (etc. polygon, irregular shape), so long as it covers the electronic contents object may be used.

Alternatively, instead of a rectangle, it is within the spirit and scope of the claimed invention that the electronic contents object is not displayed rather than masked.

For example, when one moves the mask region in the area of an electronic contents object, instead of displaying a box, the electronic contents object may simply disappear from the screen during the movement or when the finger or stylus is removed from the touchscreen. Either a continuation of the background screen or another image, such as a question mark, can be displayed. Upon performing the release command, the object can be redisplayed.

Referring now to FIG. 4B, in order to move the displayed mask region, the user touch-moves the displayed mask region to generate a scroll signal. When the scroll signal is generated, the mask region moves to a touch end point, as illustrated in FIG. 4B. The moved mask region covers a word 'BOOK'.

Referring now to FIG. 4C, in order to detect an English word corresponding to an object image, the user single-touches (single-taps) the mask region to generate a mask region release signal. When the mask region release signal is generated, the displayed mask region is released to display the word 'FLOWER' covered with the mask region, as illustrated in FIG. 4C.

Figure 5A:
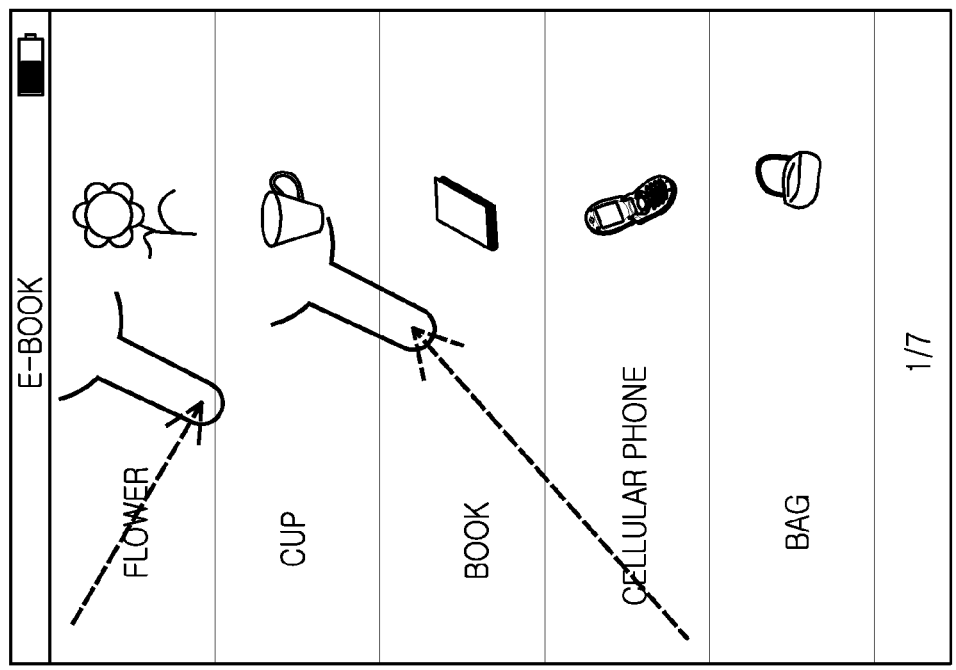
FIGS. 5A and 5B are diagrams illustrating a process of learning with an electronic book reader according to an exemplary embodiment of the present invention.
Figure 5A:
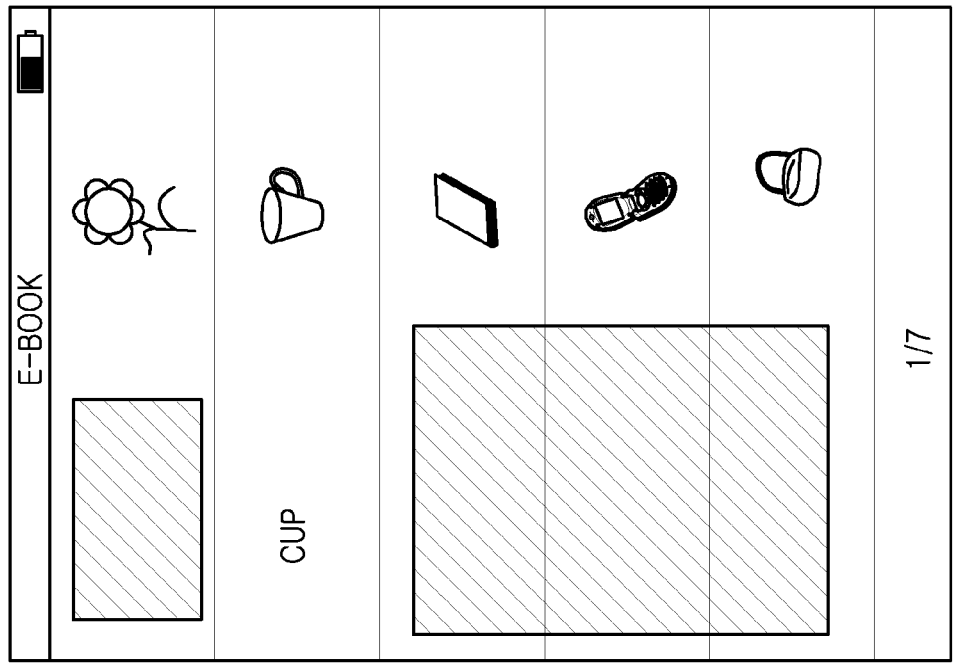
Figure 5B:
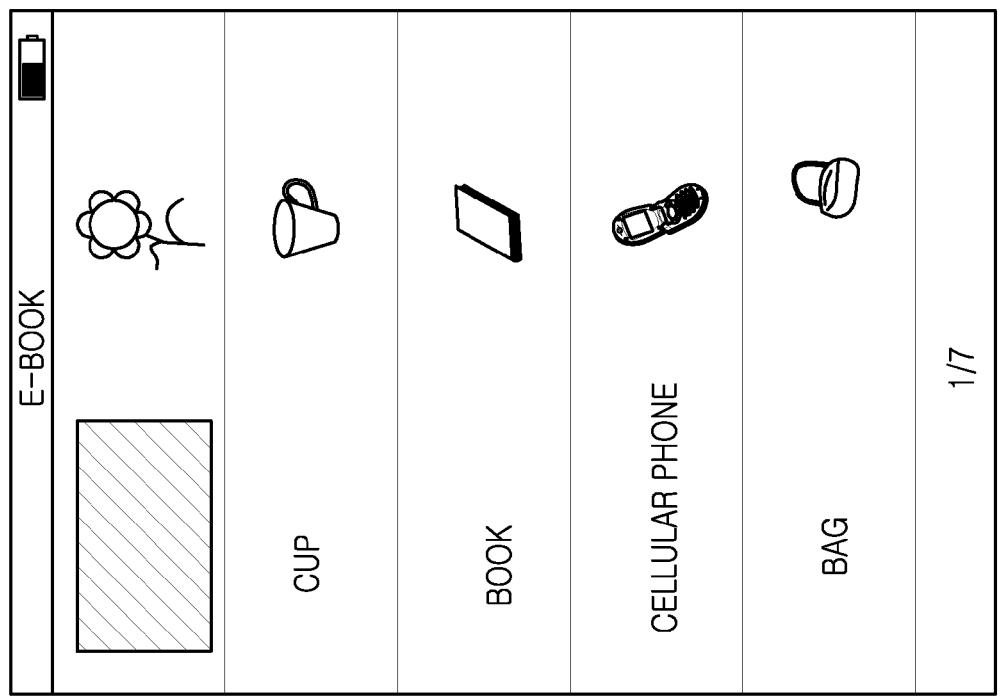
Figure 5B:
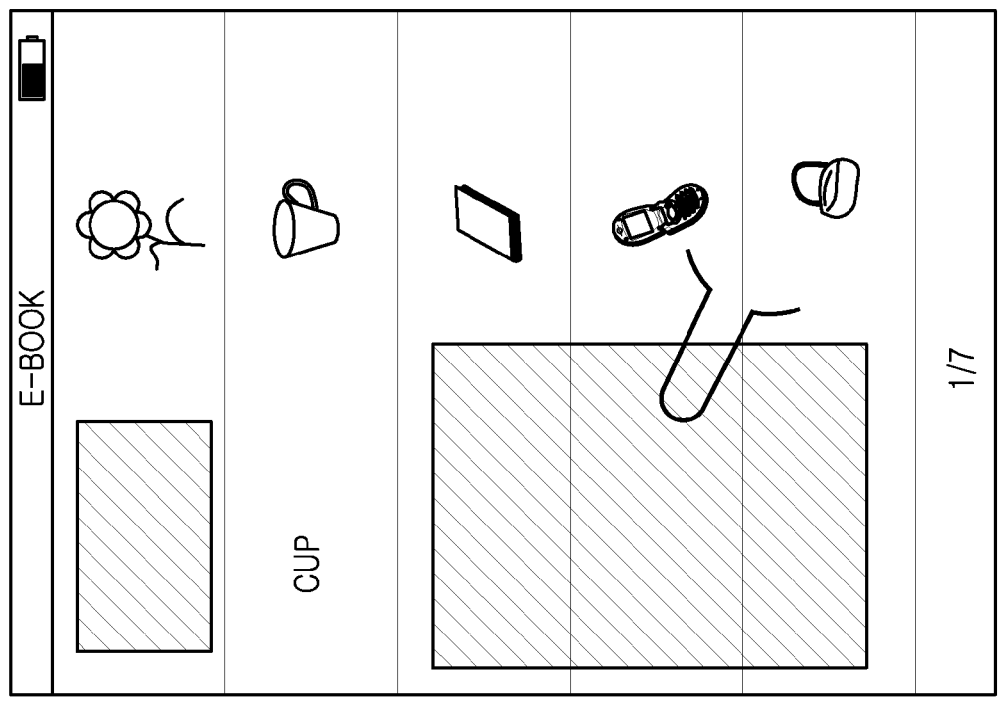

FIGS. 5A and 5B are diagrams illustrating a process of learning in an electronic book reader according to an exemplary embodiment of the present invention. The exemplary embodiment of FIGS. 5A and 5B illustrates an exemplary process of learning English words corresponding to objects. The right side of a screen of the electronic book reader displays object images, and the left side of the screen displays English words corresponding to the object images displayed on the right side of the screen.

Referring to FIG. 5A, in order to display a mask region covering a left English word, the user moves a touch diagonally to generate a mask region creation signal. When the mask region creation signal is generated, a mask region is displayed in the shape of a rectangle having a diagonal line from a touch start point to a touch end point, as illustrated in FIG. 5A. The user sequentially generates mask region creation signals to display various mask regions. As illustrated in FIG. 5A, a mask region covers a word 'FLOWER', and other mask regions cover words 'BOOK', 'CELLULAR PHONE' and 'BAG'. These mask regions may be moved as illustrated in FIG. 4B.

Referring now to FIG. 5B, in order to detect an English word corresponding to an object image, the user single-touches (single-taps) the mask region to generate a mask region release signal. When the mask region release signal is generated, the displayed mask region is released to display the word covered with the mask region. When the lower mask regions are released, the words 'BOOK', 'CELLULAR PHONE' and 'BAG' are again displayed as illustrated in FIG. 5B.

Figure 6:
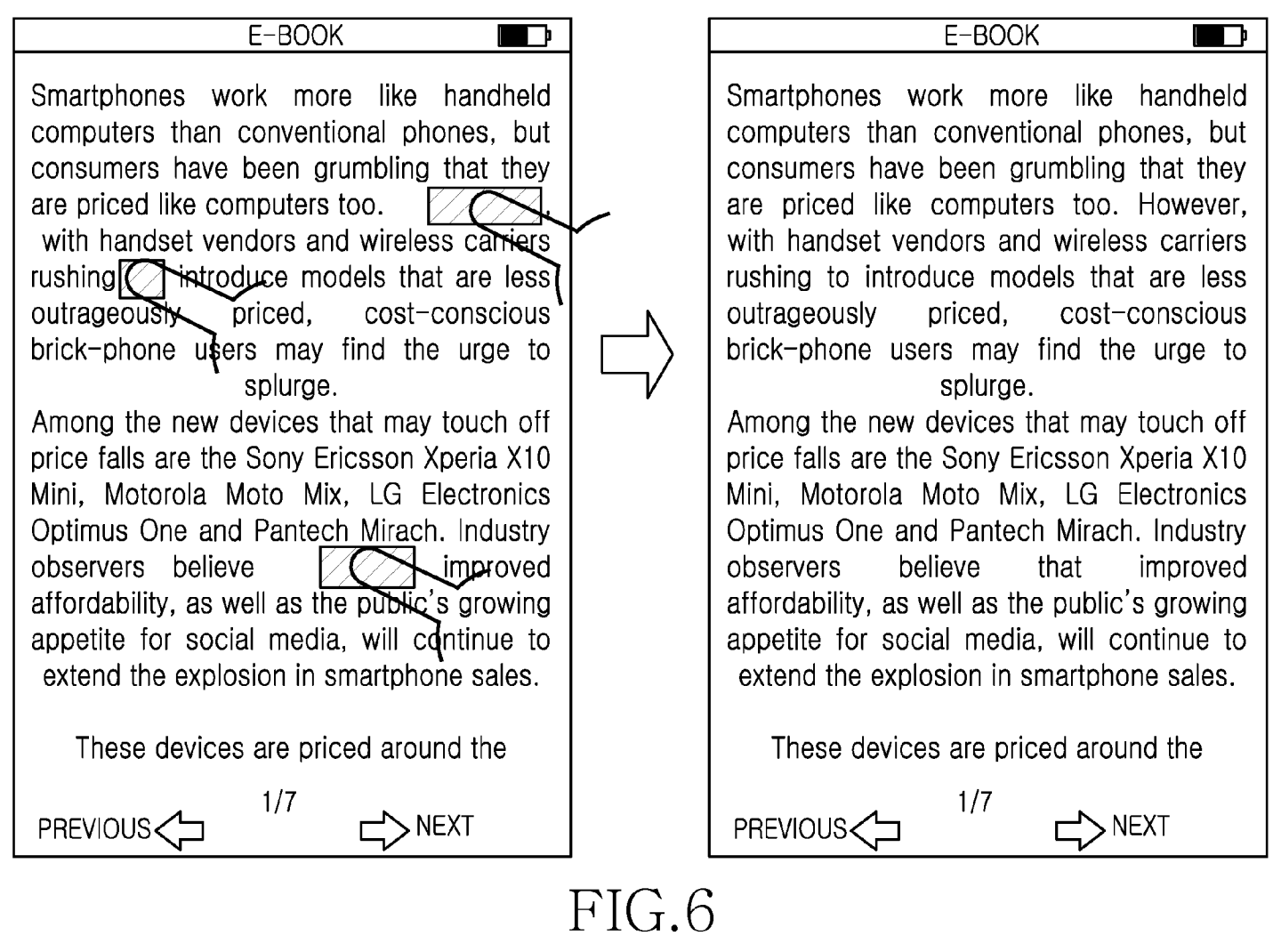

FIG. 6 is a diagram illustrating a process of learning in an electronic book reader according to another exemplary embodiment of the present invention.

Referring now to FIG. 6, according to the method described with reference to FIGS. 4A and 5A, the user may sequentially display mask regions to cover several words. The user may selectively release the displayed mask regions to detect the covered words.

Figure 7:
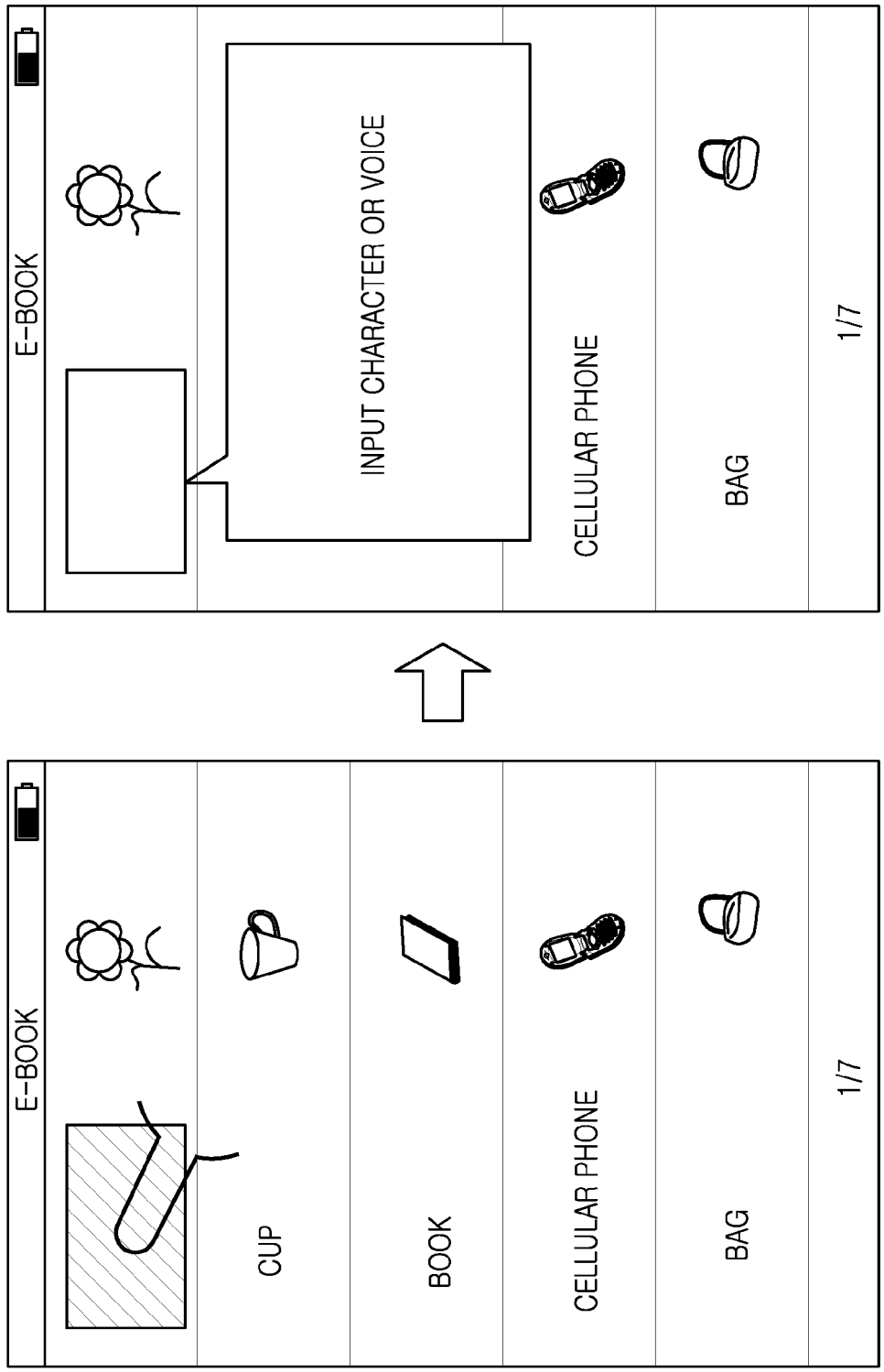
FIG. 7 is a diagram illustrating a process of learning with an electronic book reader according to an exemplary embodiment of the present invention.

FIG. 7 is a diagram illustrating a process of learning in an electronic book reader according to an exemplary embodiment of the present invention.

Referring now to FIG. 7, the user may display a mask region to cover the left word 'FLOWER'. Thereafter, in order to detect an English word corresponding to an object image, the user may single-touch (single-tap) the mask region to generate a mask region release signal. When the mask region release signal is generated, a message 'INPUT CHARACTER OR VOICE' is displayed as illustrated in FIG. 7. The user inputs a word in the mask region. The displayed mask region is released when the inputted word is identical to the word 'FLOWER'. The user inputs a voice corresponding to the word 'FLOWER' into the reader. The displayed mask region is released when the inputted voice accords with the covered word 'FLOWER'. As described above, it is assumed that the electronic book reader may recognize and compare the covered word and the inputted word to determine whether the inputted word is identical to the covered word. Also, it is assumed that the electronic book reader may recognize a voice, convert the voice into a word, and recognize and compare the voice word and the covered word to determine whether the voice word is identical to the covered word. Any type of known voice recognition can be used to determine if the user stated the correct answer.

Figure 8:
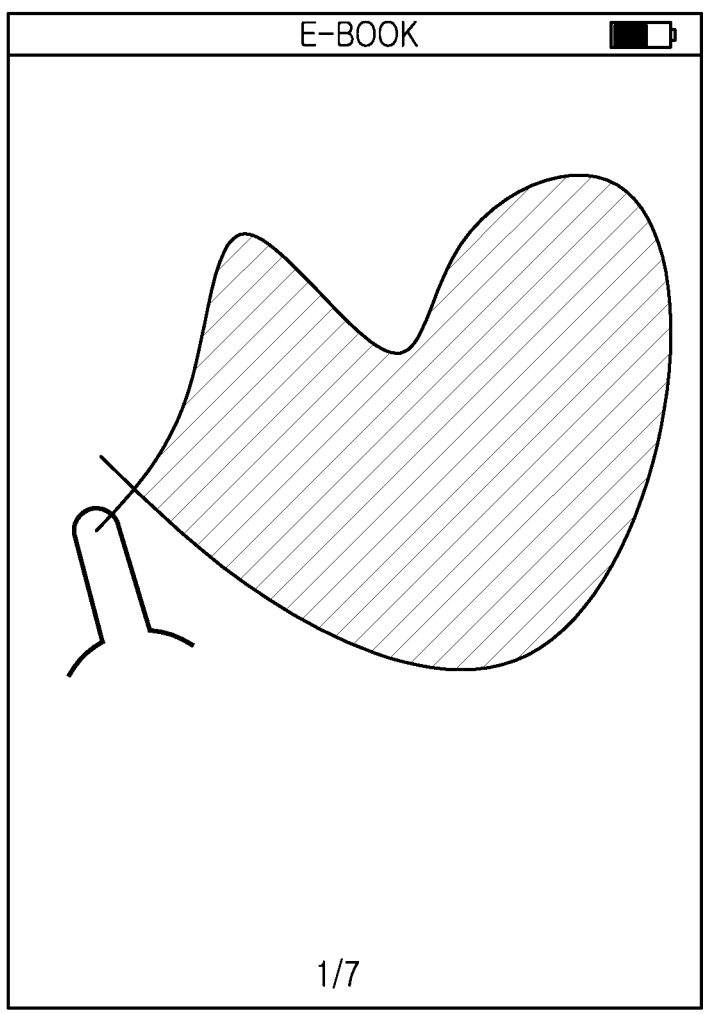
FIG. 8 is a diagram illustrating a process of displaying a mask region in an electronic book reader according to an exemplary embodiment of the present invention.

FIG. 8 is a diagram illustrating a process of displaying a mask region in an electronic book reader according to an exemplary embodiment of the present invention.

Referring now to FIG. 8, the mask region may comprise a closed region formed by a touch move path. In other words, the mask region may vary in size and shape.

As described above, the method and device for learning in the electronic book reader according to the present invention may provide an effective learning function to the user.

Through the communication unit, the user can upload or communicate status of learning via the electronic book according to the present invention to a base station or server. The masks can be used with tests after a learning period or in lieu of a learning mode to determine how much one has learned. By communicating the test scores, subsequent learning material in a series can be provided to the electronic book for learning using the masked region as discussed herein above.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for learning in an electronic device including a touch screen, the method comprising:
    detecting a request for a learning function while displaying a plurality of objects on a touch screen, the plurality of objects including a character or an image;
    providing a mask region that covers at least one object of the plurality of objects and wherein the at least one object covered by the mask region is not shown, wherein the providing of the mask region covering the at least one object comprises displaying the mask region in a shape of a substantially rectangular block defined by a diagonal line from a touch start point to a touch end point;
    responsive to detecting a touch input on the mask region, prompting a user to input an answer that comprises a character or a voice, wherein the prompting provides a writing window for inputting the character on the touch screen;
    detecting a user input character via the writing window or a user input voice via a microphone; and
    releasing the mask region when the user input character or user input voice is a correct answer corresponding to the at least one object covered by the mask region wherein the at least one object is redisplayed after releasing of the mask region and wherein a redisplay of the at least one object is independent of a display of any other object of the plurality of objects.

2. The method of claim 1, further comprising moving display of the mask region to cover another object when detecting a request for repositioning the mask region.

3. The method of claim 2, wherein the request for repositioning the mask region includes by a touch and drag.

4. The method of claim 1, further comprising displaying an image or video in the mask region.

5. The method of claim 1, wherein the providing of the mask region covering the at least one object comprises displaying the mask region in a predetermined shape sufficient in size to cover the at least one object.

6. The method of claim 1, wherein the providing of the mask region covering the at least one object comprises displaying the mask region in a shape of a closed region formed by a path of touch and drag on the touch screen.

7. The method of claim 1, further comprising, when the answer from the user input does not correspond to the at least one object covered by the mask region, providing by a speaker unit an audio output of the at least one object covered by the mask region.

8. A device for learning in an electronic book reader, comprising:
    a touch screen; and
    a control unit configured to:
        detect a request for a learning function while displaying a plurality of objects on the touch screen, the plurality of objects including a character or an image;
        provide a mask region that covers at least one object of the plurality of objects and wherein the at least one object covered by the mask region is not shown;
        responsive to detecting a touch input on the mask region, prompt a user to input an answer that comprises a character or a voice, wherein the prompt provides a writing window for inputting the character on the touch screen;
        detect a user input character via the writing window or a user input voice via a microphone; and
        release the mask region when the user input character or the user input voice is a correct answer corresponding to the at least one object covered by the mask region wherein the at least one object is redisplayed after releasing of the mask region and wherein a redisplay of the at least one object is independent of a display of any other object of the plurality of objects, wherein the control unit is configured to display the mask region in a shape of a substantially rectangular block defined by a diagonal line from a touch start point to a touch end point on the touch screen, which is inputted from an input unit.

9. The device of claim 8, wherein the control unit is configured to move the mask region to cover another object when detecting a request for repositioning the mask region.

10. The device of claim 9, wherein the request for repositioning the mask region includes a touch and drag.

11. The device of claim 8, wherein the control unit is configured to display an image or video in the mask region.

12. The device of claim 8, further comprising a speaker, wherein when the answer from the user input does not correspond to the at least one object covered by the mask region, the control unit is configured to control the speaker to provides an audio output of the at least one object covered by the mask region.

13. The device of claim 8, further comprising a communication unit transmits and receives data and status to a base station via at least one of CDMA, TDMA, GSM, or FDMA.

14. The device of claim 8, wherein the control unit is configured to display the mask region in a shape of a closed region formed by a path of a touch and drag on the touch screen.

* * * * *

UNITED STATES PATENT AND TRADEMARK OFFICE
CERTIFICATE OF CORRECTION

PATENT NO. : 9,251,714 B2  Page 1 of 1
APPLICATION NO. : 13/297583
DATED : February 2, 2016
INVENTOR(S) : Jun Yoon It is certified that error appears in the above-identified patent and that said Letters Patent is hereby corrected as shown below:

In the Claims

Column 9, Claim 12, Line 17 should read as follows:
--...speaker to provide an...--

Signed and Sealed this
Third Day of May, 2016

Michelle K. Lee
*Director of the United States Patent and Trademark Office*